Nov. 23, 1965   B. CAIGER ETAL   3,219,136
AIR CUSHION SPRAY DEFLECTOR
Filed July 19, 1962

3,219,136
AIR CUSHION SPRAY DEFLECTOR
Bernard Caiger, Shrivenham, near Swindon, and Michael Jeremy Bennison, Highworth, England, assignors to Vickers-Armstrongs (Engineers) Limited, London, England, a British company
Filed July 19, 1962, Ser. No. 211,014
Claims priority, application Great Britain, July 28, 1961, 27,532/61
7 Claims. (Cl. 180—7)

This invention relates to vehicles of the kind that are adapted to ride on an air cushion.

According to the present invention there is provided a vehicle adapted to ride on an air cushion, air escaping laterally from the underside of the vehicle in use thereof, wherein the vehicle is provided, along at least one side thereof, with means for deflecting particles and the like rising from the surface over which the vehicle travels, each such deflecting means being concave on its underside, the concave underside serving for deflecting rising particles and the like downwardly and each deflecting means being shaped and disposed to permit, upon forward motion of the vehicle, air flow over its surfaces in such a way that the occurrence of a negative pressure on the underside of the deflecting means is avoided.

Figure 1:
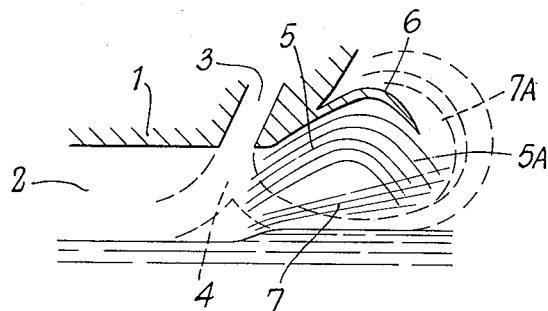
Figure 2:
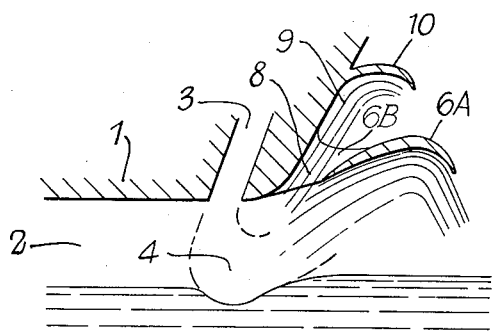
Figure 3:
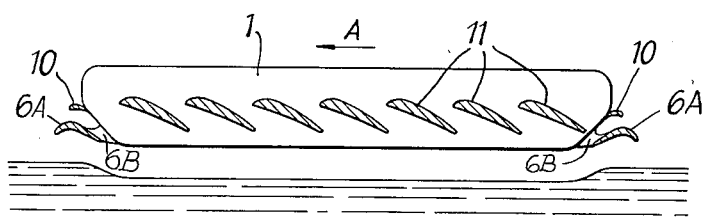

For a better understanding of the invention and to show how the same may be carried into effect, reference will now be made, by way of example, to the accompanying drawing, in which:

FIGURE 1 is a diagrammatic sectional view of the rear part of a known vehicle provided with a known spray deflector, FIGURE 2 is a diagrammatic sectional view of a peripheral part of another vehicle provided with a spray deflecting device, and FIGURE 3 is a diagrammatic partly-sectioned side elevation of a further form of vehicle provided with spray deflectors.

Vehicles known under the registered trade mark "Hovercraft" and which are adapted to ride on an air cushion contained within an air curtain formed by downwardly directed air jets around the peripheral part of the underside of the vehicle are apt to produce much spray when travelling over water. The spray may be considerably reduced by fitting deflectors as illustrated in FIGURE 1. The "Hovercraft" vehicle of FIGURE 1 rides on an air cushion 2 and has jets 3 for producing an air curtain 4. Spray 5 rising at a steep angle is deflected downwardly by a deflector 6 carried on the rear of the vehicle 1, whilst spray 7 rising at a low angle is suppressed by the deflected spray 5A. The change in momentum of the spray 5 caused by the deflector 6 produces an upward thrust on the deflector 6 so that the performance of the vehicle is slightly increased. However, when the vehicle hovers over land from which no particles or the like rise, there is a drop in performance since there is no spray or the like to be deflected to produce any upward thrust on the deflector 6 and the air curtain 4 tends to produce air flow in the form of a vortex 7A along the rear under edge of the vehicle of the vehicle 1, this vorticular flow being impeded by the deflector 6 whereby a negative pressure (i.e. a pressure below atmospheric) occurs on the underside of the deflector, this negative pressure giving rise to a drop in performance over land. In accordance with the object of the present invention the negative pressure build up is avoided in the construction of the "Hovercraft" vehicle illustrated in FIGURE 2 by providing a deflector 6A carried by and maintained spaced from the body of the vehicle 1 by struts 6B, so that an air slot 8 is provided between the rear of the body of the vehicle 1 and the nearest edge of the deflector 6A. The deflector 6A is shaped and disposed to permit an air flow in such a way that the occurrence of a negative pressure on the underside of the deflector 6A is avoided. When the vehicle of FIGURE 2 operates over water, such spray 9 as escapes upwardly through the slot 8 is deflected downwardly by an auxiliary deflector 10 positioned above the deflector 6 at a location sufficiently high not to interfere with the air vortex produced by the curtain 4.

In the "Hovercraft" vehicle of FIGURE 3 the front and rear sides of the vehicle are provided with deflectors 6A and 10 arranged as in FIGURE 2. Along each longitudinal side of the vehicle the latter is provided with discrete overlapping deflectors 11 each of which in section is of aerofoil form and each of which is secured directly to the side of the vehicle without any intervening slot. In front view each deflector 11 extends at first upwardly from the vehicle and then curves over to extend downwardly. The shape of each deflector 11 in front view is similar to that of the illustrated shape of the deflector 6 in FIGURE 1. Upon high speed forward motion of the vehicle, i.e. high speed motion in the direction A, air flows across the underside of each deflector 11 so that negative pressure cannot occur on the undersides of these deflectors which behave like aerofoils and cause a high pressure to be induced on their under surfaces and a low pressure on their upper surfaces. The concave under surfaces of the deflectors 11 cause the spray to be deflected downwardly and because of the overlapping arrangement of the deflectors 11 little or no spray escapes upwardly between the deflectors.

Each such deflector 11 can be made pivotable about a horizontal axis perpendicular to the longitudinal axis of the vehicle, the deflectors 11 being connected to mechanism for tilting the deflectors on the left- and right-hand sides of the vehicle at the same time but in opposite senses thereby to control rolling of the vehicle. Such mechanism could also make provision for placing both the left- and right-hand deflectors 11 in a neutral position with no overlap and small clearances between adjacent deflectors 11. This neutral position of the deflectors 11 would be suitable for low speed operation of the Hovercraft.

If desired the invention can be employed in conjunction with a vehicle employing an air curtain other than that shown in FIGURE 2, for example, with a vehicle employing a recirculated curtain, or with a vehicle having the jets 3 extended downwardly by flexible sheet material. The air curtain need not extend around the whole of the periphery of the underside of the vehicle. If desired the longitudinal sides of the vehicle may be provided with depending side walls of solid material which may be either flexible or non-flexible, these walls extending from front to rear of the vehicle so that the curtain encircling the cushion is formed by the solid walls at the longitudinal sides of the vehicle and by downwardly directed air streams across the front and rear sides of the vehicle, these air streams being formed by jets 3 extending across the front and rear sides of the vehicle.

Although the deflecting devices of FIGURES 2 and 3 have been described as being applied to air curtain Hovercraft vehicles, it is to be understood that the deflecting devices could also be adventageously used on air cushion borne vehicles of the plenum chamber kind.

The invention is not limited to vehicles primarily intended for use over water but extends to land vehicles as well for deflecting sand, dust, mud and stones when caused to rise by the vehicle.

We claim:
1. In a vehicle including a vehicle body and adapted to ride on an air cushion from the underside of which air escapes when the vehicle is in use causing particles and the like to rise from the surface over which the vehicle travels, and means located along at least one side of the vehicle body for deflecting said rising particles and the like, the improvement in which each such deflecting means is concave on its underside and mounted in spaced relation to the body of the vehicle, the concave underside of said deflecting means deflecting rising particles and the like downwardly, and each deflecting means having a shape and being disposed in such a position that upon forward motion of the vehicle, air flows over its surfaces in such a way that the occurrence of a negative pressure on the underside of the deflecting means is avoided.

2. A vehicle as claimed in claim 1, wherein the vehicle is provided with downardly directed jet means disposed around the peripheral part of the underside of the vehicle for producing an air curtain that encircles the air cushion.

3. A vehicle as claimed in claim 1, including a plurality of side by side deflectors secured to the body of the vehicle along one longitudinal side thereof, each such deflector in front view extending at first upwardly from the body of the vehicle and then curving over to extend downwardly, the arrangement of said deflectors being such that upon forward motion of the vehicle, air flows across the underside of each deflector so that negative pressure cannot occur on the undersides of said deflectors.

4. A vehicle as claimed in claim 1, including means for securing the deflecting means to the body of the vehicle and for maintaining it spaced from the adjacent side thereof, thereby providing an air slot between said adjacent side of the body of the vehicle and the nearest edge of the deflecting means.

5. A vehicle as claimed in claim 4, including an auxiliary deflector secured to said adjacent side of the body of the vehicle at a location above said air slot for deflecting downwardly such of the particles and the like as pass upwardly through said air slot.

6. A vehicle as claimed in claim 1, wherein the air cushion is contained within a curtain formed partly by solid walls depending from peripheral parts of the underside of the vehicle and partly by an air curtain formed by downwardly directed jet means on other peripheral parts of the underside of the vehicle.

7. A vehicle as claimed in claim 6, wherein said walls are provided on the longitudinal sides of the vehicle and extend from front to rear of the vehicle, and wherein the downwardly directed jet means extend across the the front and rear sides of the vehicle.

References Cited by the Examiner
UNITED STATES PATENTS
2,953,321   9/1960   Robertson et al. _____ 180—7

OTHER REFERENCES

Symposium on Ground Effect Phenomena, Princeton Univ., Oct. 21, 1956.

"Research Related to GEM," by Kuhn et al., p 28 and figure referred to therein; "Two Dimension Study of a Low Pressure Annular GEM at Forward Speed," by Tucker, pp. 101 and 102 and FIGS. 1 and 2; and "Test Results of an Annular-Jet G.E.V.," by Silverman, pp 151–155 and FIGS. 5 and 11.

BENJAMIN HERSH, *Primary Examiner.*

PHILIP ARNOLD, A. HARRY LEVY, *Examiners.*